United States Patent
Guo et al.

(10) Patent No.: US 10,340,781 B2
(45) Date of Patent: Jul. 2, 2019

(54) LINEAR MOTOR

(71) Applicants: Shun Guo, Shenzhen (CN); Lubin Mao, Shenzhen (CN); Zhaoxian Chen, Shenzhen (CN)

(72) Inventors: Shun Guo, Shenzhen (CN); Lubin Mao, Shenzhen (CN); Zhaoxian Chen, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 293 days.

(21) Appl. No.: 15/412,894

(22) Filed: Jan. 23, 2017

(65) Prior Publication Data
US 2018/0026510 A1   Jan. 25, 2018

(30) Foreign Application Priority Data

Jul. 21, 2016   (CN) .................... 2016 2 0773803 U

(51) Int. Cl.
| H02K 33/18 | (2006.01) |
| H02K 1/17 | (2006.01) |
| H02K 1/34 | (2006.01) |
| H02K 5/04 | (2006.01) |
| H02K 33/16 | (2006.01) |

(52) U.S. Cl.
CPC .............. *H02K 33/18* (2013.01); *H02K 1/17* (2013.01); *H02K 1/34* (2013.01); *H02K 5/04* (2013.01); *H02K 33/16* (2013.01)

(58) Field of Classification Search
CPC .. H02K 1/16; H02K 1/17; H02K 1/34; H02K 5/04; H02K 33/18
See application file for complete search history.

(56) References Cited

U.S. PATENT DOCUMENTS

| 6,192,136 | B1 * | 2/2001 | Azima ................. | B42D 15/022 381/338 |
| 8,461,728 | B2 * | 6/2013 | Park ....................... | H02K 33/00 310/15 |
| 8,912,692 | B2 * | 12/2014 | Chang ................... | H02K 33/16 310/21 |
| 2014/0054982 | A1 * | 2/2014 | Park ....................... | B06B 1/045 310/25 |

* cited by examiner

*Primary Examiner* — Dang D Le
(74) *Attorney, Agent, or Firm* — Na Xu; IPro, PLLC

(57) ABSTRACT

A linear motor is disclosed. The linear motor includes a housing; a vibrating assembly arranged in the housing, the vibrating assembly including a weight and a plurality of coils connecting with the weight; a magnet assembly connecting with the housing, the magnet assembly including a main magnet and a side magnet; and an elastic connecting piece supporting the vibrating assembly in the housing elastically. The coils are arranged around the main magnet; and the side magnet is arranged adjacent to peripheries of the coils.

9 Claims, 2 Drawing Sheets

LINEAR MOTOR

FIELD OF THE INVENTION

The invention is related to the technology of vibrators, and especially relates to a linear motor for providing tactile feedbacks.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, which is taken as one feedback form of the portable consumer electronic product, has been extended to provide the tactile feedback related to application program and scene, etc. gradually from the initial and most fundamental coming call prompt, etc. While the motor is the primary element offering vibration feedback in the mobile equipment and usually comprises a rotary motor, a piezoelectric motor, a linear motor, etc., wherein the linear motor has the absolute advantage on the aspect of offering the tactile feedback related to the application program and the scene due to its small volume, long service life, low power dissipation, rapid response, etc.

A related linear motor comprises a housing, a magnet assembly arranged in the housing, a vibrating assembly and an elastic connecting piece supporting the vibrating assembly in the housing elastically, wherein the vibrating assembly comprises coils and a weight; the magnet assembly comprises a magnet and magnetic bowl or a side magnet; and a magnetic gap is formed by the magnet and the magnetic bowl jointly. One part of the coils is located in the magnetic gap and the coil shall implement reciprocating vibration with the weight in presence of ampere force upon being electrified. But the linear motor in relevant technology has the defects, such as small internal magnetic field in the magnetic gap, small magnetic drive force and low efficiency of magnetic circuit.

Therefore, it is necessary to provide an improved linear motor to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood that specific embodiment described hereby is only to explain this disclosure, not intended to limit this disclosure.

Figure 1:
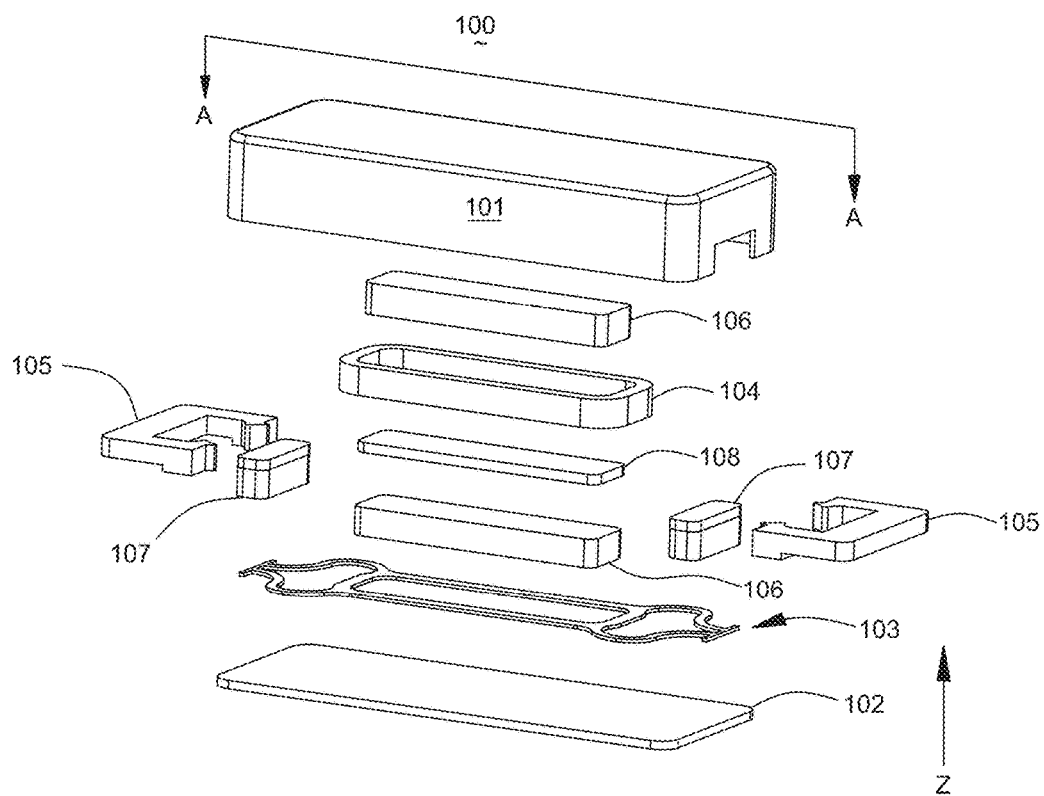
FIG. 1 is an exploded view of a linear motor in accordance with an exemplary embodiment of the present disclosure.
Figure 2:
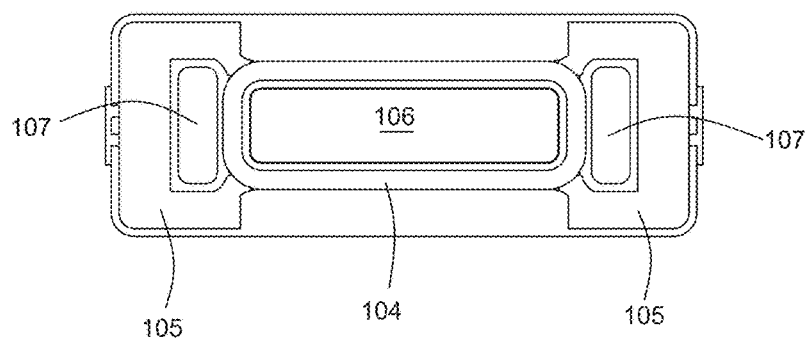
FIG. 2 is a top view of the linear motor in FIG. 1, wherein a cover plate thereof has been removed.
Figure 3:
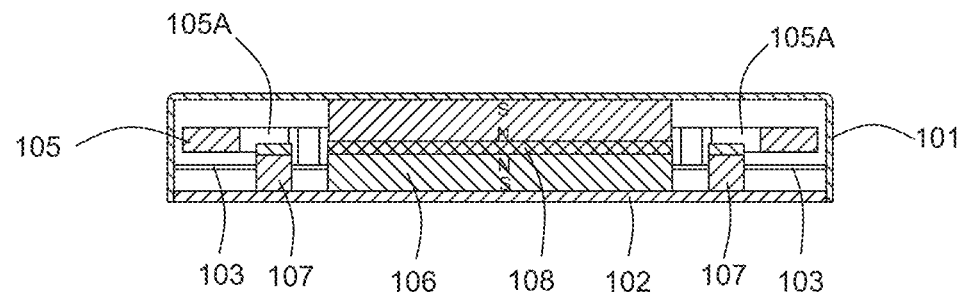
FIG. 3 is a cross-sectional view of the linear motor taken along line A-A in FIG. 2.

As shown in FIGS. 1-3, a linear motor 100 in accordance with an exemplary embodiment of the present disclosure comprises a housing, a vibrating assembly arranged in the housing, a magnet assembly connecting with the housing and an elastic connecting piece 103 supporting the vibrating assembly in the housing elastically. The housing comprises a housing 101 whose one side is opened and a cover plate 102 connecting with the housing 101 and forming the accommodating space. Moreover, the housing 101 has a long side and a short side connecting with the long side.

The vibrating assembly comprises coils 104 and weights 105 connecting with the coils 104. The coil 104 has a long shaft and a short shaft; two weights 105 are arranged respectively to connect with the short shaft of the coil 104.

The magnet assembly comprises two main magnets 106 which are arranged oppositely and a soft magnetic material 108 arranged among two magnets 106; and the magnetic poles having identical polarity of two main magnets 106 are arranged oppositely. The coils 104 are arranged around the main magnet 106. The magnet assembly further comprises a side magnet 107 arranged at the periphery of the coil 104; and the magnetic gap is formed between the side magnet 107 and the main magnet 106. The coils 104 shall implement reciprocating vibration along direction Z in presence of the magnetic force after being electrified. In this embodiment, the side magnet 107 shall be arranged along with the short side of the housing 101. Moreover, the side magnet 107 is also provided with the soft magnetic materials for gathering the magnetic lines of force, and the side magnet 107 can also be not provided with the soft magnetic material.

The main magnet 106 and the side magnet 107 can be fabricated with greater thickness because the coils 104 are arranged around the main magnet 106; therefore, the thickness of the housing can be utilized fully, the magnetic field intensity can be increased, and the magnetic drive force can be improved.

Figure 4:
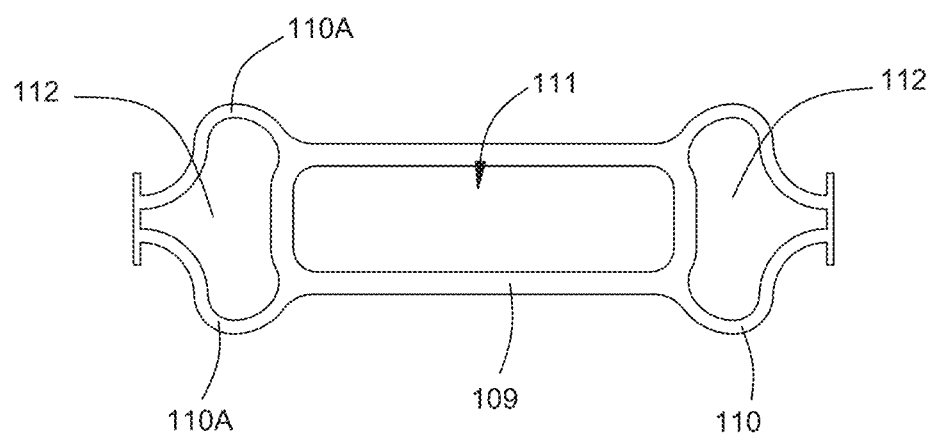
FIG. 4 is an illustrative view of an elastic connecting piece of the linear motor.

As shown in FIG. 4, the elastic connecting piece 103 for supporting the vibrating assembly comprises a main body part 109 for fixing the coils 104 and an elastic connecting part 110 extending from two sides of the main body part 109 respectively; the elastic connecting part 110 is connected with the short side of the housing 101 fixedly. The main body part 110 shall also be provided with an accommodation hole 111 for keeping away from the main magnet 106, and the elastic connecting part 110 is also provided with the avoidance hole 112 for avoiding the side magnet 107 in order not to interfere vibration of the vibrating assembly in the direction Z because the coils 104 are arranged around the main magnet 106 and the side magnet 107 is also arranged at the periphery of the coils. The avoidance hole 112 is formed by two elastic arms 110A extending from the main body part 109 in the enclosing way, and the two elastic arms 110A are arranged symmetrically. Correspondingly, the weights 105 are also provided with through holes 105A for avoiding the side magnet 107. Moreover, the elastic connecting piece 103 can be formed by means of integral stamping.

The linear motor of the resent disclosure is featured with novel structure, and the magnet assembly can be thickened on the premise that the former dimensions of the motor are not changed; therefore, the magnetic field intensity can be increased greatly, the magnetic drive force can be improved, and the efficiency of the magnetic circuit of the linear motor shall be much higher than that of the conventional linear motor.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear motor comprising:
   a housing;
   a vibrating assembly arranged in the housing, the vibrating assembly including a weight and a plurality of coils connecting with the weight;
   a magnet assembly connecting with the housing, the magnet assembly including a main magnet and a side magnet; and
   an elastic connecting piece supporting the vibrating assembly in the housing elastically; wherein
   the coils are arranged around the main magnet; and the side magnet is arranged adjacent to peripheries of the coils;
   wherein the elastic connecting piece comprises a main body part for fixing the coils and an elastic connecting part extending respectively from two sides of the main body part; and the elastic connecting part is connected with the housing.

2. The linear motor as described in claim 1, wherein the main magnet comprises two magnets such configured that the same magnetic poles thereof are opposed to each other.

3. The linear motor as described in claim 2 further including soft magnetic materials arranged between the two main magnets.

4. The linear motor as described in claim 1, wherein the housing has a long side and a short side connecting with the long side; and the side magnet is arranged along with the short side of the housing.

5. The linear motor as described in claim 1, wherein the main body part is further provided with an accommodation hole for at least partially receiving the main magnet.

6. The linear motor as described in claim 5, wherein the elastic connecting part is provided with an avoidance hole for at least partially receiving the second side magnet.

7. The linear motor as described in claim 6, wherein the avoidance hole is formed by two elastic arms extending from the main body part; and two elastic arms are arranged symmetrically.

8. The linear motor as described in claim 6, wherein the coil has a long shaft and a short shaft; and the weight are connected with the short shaft of the coil and is provided with a through hole for at least partially receiving the second side magnet.

9. The linear motor as described in claim 1, wherein the side magnet is further provided with a soft magnetic material.

* * * * *